US006822355B2

United States Patent
Karrelmeyer et al.

(10) Patent No.: US 6,822,355 B2
(45) Date of Patent: Nov. 23, 2004

(54) ELECTRONICALLY-COMMUTATED MOTOR

(75) Inventors: Roland Karrelmeyer, Ditzingen (DE); Elmar Dilger, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/466,154

(22) PCT Filed: Jun. 11, 2002

(86) PCT No.: PCT/DE02/02080

§ 371 (c)(1),
(2), (4) Date: Jul. 10, 2003

(87) PCT Pub. No.: WO03/049274

PCT Pub. Date: Jun. 12, 2003

(65) Prior Publication Data

US 2004/0051408 A1 Mar. 18, 2004

(30) Foreign Application Priority Data

Nov. 5, 2000 (DE) ......................... 101 56 243

(51) Int. Cl.$^7$ .............................................. H02K 11/00
(52) U.S. Cl. ..................................... 310/68 B; 318/701
(58) Field of Search ............................ 310/68 B, 68 R, 310/168; 318/701

(56) References Cited

U.S. PATENT DOCUMENTS

| 4,808,868 A | * | 2/1989 | Roberts | 310/68 R |
|---|---|---|---|---|
| 5,051,680 A | * | 9/1991 | Belanger | 318/701 |
| 5,111,095 A | * | 5/1992 | Hendershot | 310/168 |
| 5,113,113 A | * | 5/1992 | Tepavcevic | 318/701 |
| 5,291,115 A | * | 3/1994 | Ehsani | 318/701 |
| 5,440,218 A | * | 8/1995 | Oldenkamp | 318/701 |
| 5,589,751 A | * | 12/1996 | Lim | 318/701 |
| 5,864,218 A | * | 1/1999 | Orthmann | 318/701 |
| 5,949,211 A | | 9/1999 | McCann | |
| 6,495,937 B2 | * | 12/2002 | Mosimann | 310/68 B |
| 6,661,206 B2 | * | 12/2003 | Gallegos-Lopez | 322/23 |
| 2001/0004173 A1 | | 6/2001 | Mosimann | |

FOREIGN PATENT DOCUMENTS

| EP | 234663 A1 | * | 9/1987 | ......... H02K/29/12 |
|---|---|---|---|---|
| EP | 0 371 661 | | 6/1990 | |
| EP | 446058 A2 | * | 9/1991 | ......... H02K/19/06 |
| EP | 720283 A2 | * | 7/1996 | ............ H02P/8/00 |
| EP | 0 732 801 | | 9/1996 | |

* cited by examiner

Primary Examiner—Joseph Waks
(74) Attorney, Agent, or Firm—Kenyon & Kenyon

(57) ABSTRACT

An electronically commutated motor contains a rotor position determination, which detects a surface at which the rotor and stator poles (10 through 15; 17 through 20) diametrically oppose one another. The total surface is taken into consideration in the position determination. The pole angles ($\beta_S$, $\beta_R$) of the stator and rotor poles (10 through 15; 17 through 20) are each set to values at which a rotor rotation results in a surface change.

6 Claims, 2 Drawing Sheets

ELECTRONICALLY-COMMUTATED MOTOR

FIELD OF THE INVENTION

The present invention is directed to an electronically commutated motor.

BACKGROUND INFORMATION

An electronically commutated motor is referred to in European Patent Application No. 0 732 801, which refers to a rotor containing a rotor position detector which detects a surface at where the rotor and stator poles diametrically oppose one another. A test current is applied simultaneously to all three phases of the electronically commutated motor, which may be a switched reluctance motor having three phases, six stator poles and four rotor poles. Due to the different coverage between the rotor and stator poles, the inductance in at least one phase differs from that in the two other phases. The inductance influences the rate of current rise of the test current, which is detected in all three phases. The rates of current rise corresponding to the inductances are compared with three predetermined signal level classes and classified accordingly. Based on the principle of measurement and the geometric relationships between the surfaces located between the rotor poles and stator poles, such position detection makes a precision of 15° possible, which may be adequate to determine the phase to be supplied with current for the starting operation of the motor.

SUMMARY OF THE INVENTION

The object of the exemplary embodiment and/or exemplary method of the present invention is to provide an electronically commutated motor having a rotor position detection which offers a high level of precision.

In the electronically commutated motor according to the present invention, the entire surface at which the rotor and stator poles diametrically oppose one another is considered in the position detection. In doing so, the pole angles of the rotor and stator poles are always to be set to values at which a rotor rotation results in a surface change.

The exemplary embodiment and/or exemplary method of the present invention makes the rotor position available with high precision within an angular range of rotor rotation. The angular range of rotor rotation is a function of the number of poles of the rotor. In a four-pole rotor, it is sufficient to determine the position within a angular range of 90°. In a six-pole rotor, 60° is sufficient. Within these angular ranges of rotor rotation, its possible to make a rough position determination using, for example, the device of the related art. In doing so, a precision of ±15° is achieved in a three-phase motor having six stator poles and four rotor poles. Within this angular range, the exemplary embodiment and/or exemplary method of the present invention increases the precision to less than 1°. The pole angles of rotor and stator poles may be determined either experimentally or by using tables. The values at which a maximum surface change occurs during a rotor rotation may be selected.

Exemplary embodiments of the electronically commutated motor and/or exemplary method according to the present invention are described herein.

According to one exemplary embodiment, the rotor pole angle is identical to the stator pole angle. Aside from the advantages from the point of view of the magnetic flux, this embodiment may have the advantage that the determination of the pole angle of the rotor and stator poles is simplified.

According to an exemplary embodiment, the stator includes at least two parts and that the measurement of capacitance between the at least two stator parts is used to determine the position. The capacitive coupling occurs at the stator segments produced by dividing the stator and also at the position-dependent overlapping surfaces between the rotor and stator poles.

According to an exemplary embodiment, the inductance of the total system composed of the rotor and stator is detected. In this connection, at least some poles (which may be all poles) of the rotor contain a sensor winding. All windings may be connected in series.

Another exemplary embodiment provides the combination of capacitance and inductance measurement. The inductance and the capacitance are interconnected to form an oscillating circuit, a series oscillating circuit, for example. A variable frequency generator excites the oscillating circuit, the oscillating circuit voltage being detected. A change in frequency of the variable frequency generator makes it possible to determine the resonance frequency of the oscillating circuit, which is a measure of the position of the rotor.

The electronically commutated motor of the present invention is implemented, for example, as a switched reluctance motor, which has a robust structure since the rotor contains no additional electrical component.

Other exemplary embodiments of the electronically commutated motor according to the present invention are described herein.

DETAILED DESCRIPTION

Figure 1:
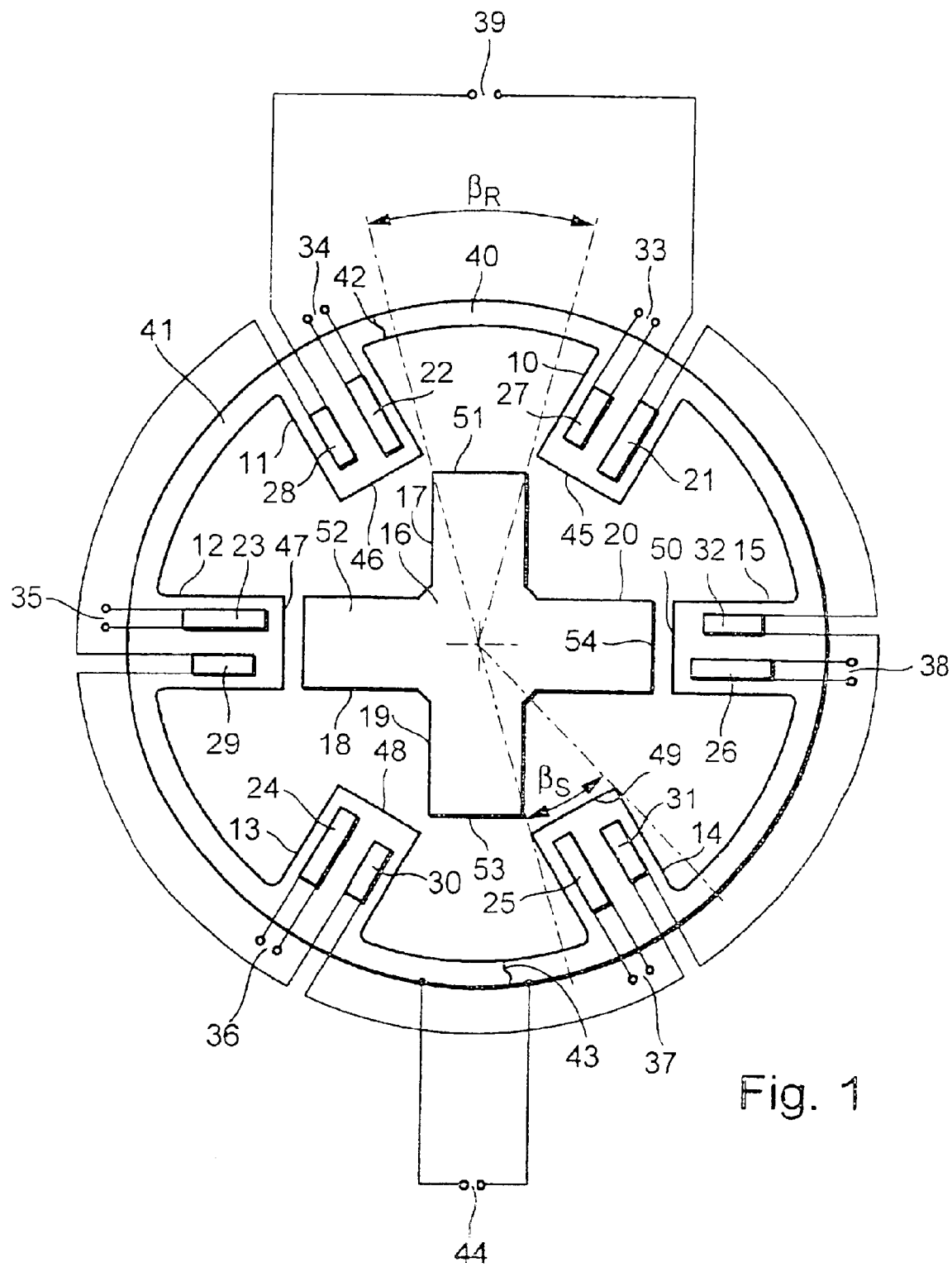
FIG. 1 shows a sketch of an electronically commutated motor, which in the exemplary embodiment shown has six stator poles and four rotor poles.

In FIG. 1, a switched reluctance motor is shown as an example of an electronically commutated reluctance motor having a first through sixth stator pole 10 through 15 and a rotor 16 having a first through fourth rotor pole 17 through 20.

Stator poles 10 through 15 have a stator pole angle $\beta_S$ and rotor poles 17 through 20 have a rotor pole angle $\beta_R$. Stator poles 10 through 15 are each provided with a first through sixth pole winding 21 through 26 and a first through sixth sensor winding 27 through 32.

First through sixth pole windings have first through sixth pole winding terminals 33 through 38. First through sixth sensor windings 27 through 32 are connected in series, the series connection being connected to a first sensor terminal 39.

Stator 16 of the electronically commutated motor is divided into a first and second stator segment 40, 41, which are joined at a first and second point of separation 42, 43. Each of the two stator segments 40, 41 is electrically contacted and is connected to a second sensor terminal 44.

The faces of stator poles 10 through 15 have first through sixth stator pole surfaces 45 through 50 and rotor 16 has first through fourth rotor pole surfaces 51 through 54 on the faces of its rotor poles 17 through 20.

Figure 2A:
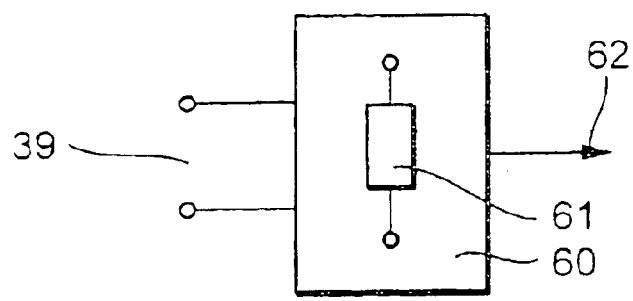
FIG. 2a shows an inductive position determination.

FIG. 2a shows a first sensor signal analyzer 60 which is connected to first sensor terminal 39. First sensor signal analyzer 60 determines inductance 61 of the system, which includes first through sixth stator pole 10 through 15 and rotor 16 having a first through fourth rotor pole 17 through 20. First sensor signal analyzer 60 emits an output signal 62 as a function of inductance 61 as a measure of the surface where rotor and stator pole surfaces 45 through 50, 51 through 54 diametrically oppose one another.

Figure 2B:
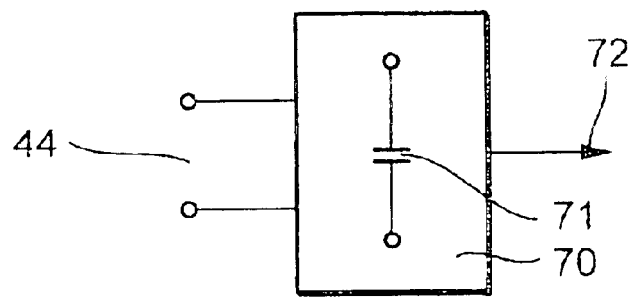
FIG. 2b shows a capacitive precision determination.

FIG. 2b shows a second sensor signal analyzer 70, which is connected to second sensor terminal 44. Second sensor signal analyzer 70 determines capacitance 71, which arises between the two stator segments 40, 41. Second sensor signal analyzer 70 emits an output signal 72, which is also a measure of the surface at which rotor and stator pole surfaces 45 through 50, 51 through 54 diametrically oppose one another.

Figure 2C:
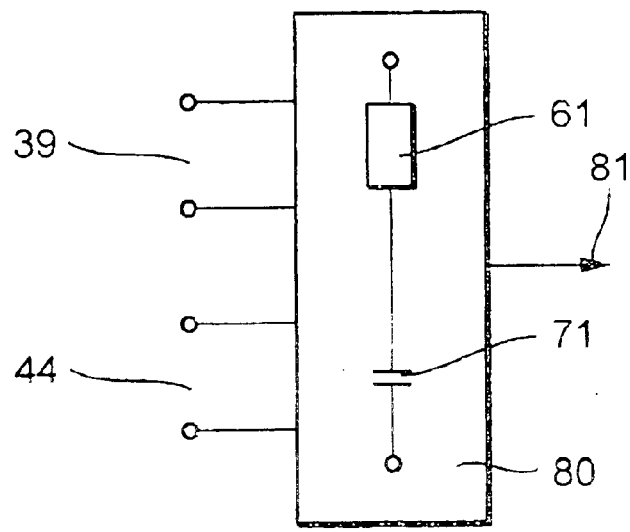
FIG. 2c shows a position determination using an oscillating circuit.

FIG. 2c shows a third sensor signal analyzer 80, which is connected to both first sensor terminal 39 and second sensor terminal 44. Third sensor signal analyzer 80 contains an oscillating circuit including inductance 61 and capacitance 71. The third sensor signal analyzer emits an output signal 81, which is again a measure of the surface at which rotor and stator pole surfaces 54 through 50, 51 through 54 diametrically oppose one another.

The switched reluctance motor shown in FIG. 1 as an example of an electronically commutated motor contains first through sixth stator pole 10 through 15 and rotor 16 including first through fourth rotor pole 17 through 20. Instead of the pole numbers shown, it is entirely possible to provide another pole number combination, for example, a motor having eight stator poles and six rotor poles.

First through sixth pole winding 21, 26 attached to first through sixth stator pole 10 through 15 is connected to at least one output stage circuit (not shown in greater detail) which feeds the excitation current in first through sixth pole winding 21 through 26 at specific points in time, which are determined based on the position of the rotor. In the switched reluctance motor shown in the exemplary embodiment, first and third pole winding 21, 24, second and fourth pole winding 22, 25 and third and sixth pole winding 23, 26 may be each connected to form one phase. The interconnection must be made in such a way that a magnetic field is produced at every two diametrically opposite stator pole surfaces 45, 48; 46, 49; 47, 50, the magnetic field oriented toward the rotor in the particular specified direction. Accordingly, the current must be supplied in a predetermined sequence and for a duration dependent on the rotor speed in order to be able to generate a torque in a specified direction. The efficiency should be as high as possible. It is therefore necessary to know the position of rotor 16 including symmetries. It is possible roughly to determine the position of rotor 16, for example, using the device mentioned in the related art, where it is possible to determine the position of rotor 16 with a precision of ±15° by measuring the rate of rise of the current in the three phase windings and assigning it to three current ranges. The rate of rise of the current depends on the inductances that arise in each of the phase windings. The ±15° precision of the sector determined applies in this case to an electronically commutated motor, which in the exemplary embodiment shown according to FIG. 1, has six stator poles 10 through 15, four rotor poles 17 through 20 and in addition an interconnection of stator poles 10 through 16 to form three phases. The determination of the sector of ±15° in which rotor 16 is situated is sufficient to be able to select the relevant phase for the starting operation.

The device of the present invention now makes it possible to determine the position of rotor 16 within the, for example, ±15° sector by measuring the surface at which stator pole surfaces 45 through 50 and rotor pole surfaces 51 through 54 diametrically oppose one another. In doing so, it must be assumed that the surface will change during a rotation of rotor 16. The change depends on stator pole angle $\beta_S$, rotor pole angle $\beta_R$, and the geometric configuration of the motor. For example, with an uneven distribution of stator poles 10 through 15 in the radial direction and/or an uneven distribution of rotor poles 17 through 20 with reference to the direction of rotation, a surface change may occur during a rotation. The surface or the surface change during a rotation of rotor 16 may be determined either experimentally or calculated as a function of angle of rotation steps.

According to an exemplary embodiment of the present invention, it is assumed that stator pole angle $\beta_S$ and rotor pole angle $\beta_R$ are of equal size. This measure ensures that an at least approximately equal magnetization occurs both in stator poles 10 through 15 and in rotor poles 17 through 20, with reference to a surface unit, so that the magnetizability of the material used is utilized as completely as possible. The following Table 1 presupposes that stator pole angle $\beta_S$ and rotor pole angle $\beta_R$ are each equal to $\beta$. The motor according to the exemplary embodiment may be designed in such a way that the following relation applies:

$$30° \leq \beta \leq 45°$$

Generally, the surface varies during a rotation of rotor 16 at a period of 360°/(number of rotor poles 17 through 20)–360°/(number of stator poles 10 through 15), it being assumed that the number of rotor poles 17 through 20 is not equal to the number of stator poles 10 through 15. In the exemplary embodiment mentioned, the period accordingly amounts to 30°. Table 1 contains the sum of the angle sectors proportional to the surface at which stator poles 10 through 15 and rotor poles 17 through 20 diametrically oppose one another.

TABLE 1

|  |  | 1° | 2° | 3° | 4° | 5° | 6° | 7° | 8° | 9° | 10° | 11° | 12° | 13° | 14° |  |
| β | 0° | 29° | 28° | 27° | 26° | 25° | 24° | 23° | 22° | 21° | 20° | 19° | 18° | 17° | 16° | 15° |
| --- | --- | --- | --- | --- | --- | --- | --- | --- | --- | --- | --- | --- | --- | --- | --- | --- |
| 30° | 60 | 60 | 60 | 60 | 60 | 60 | 60 | 60 | 60 | 60 | 60 | 60 | 60 | 60 | 60 | 60 |
| 31° | 66 | 64 | 64 | 64 | 64 | 64 | 64 | 64 | 64 | 64 | 64 | 64 | 64 | 64 | 64 | 64 |
| 32° | 72 | 70 | 68 | 68 | 68 | 68 | 68 | 68 | 68 | 68 | 68 | 68 | 68 | 68 | 68 | 68 |
| 33° | 78 | 76 | 74 | 72 | 72 | 72 | 72 | 72 | 72 | 72 | 72 | 72 | 72 | 72 | 72 | 72 |
| 34° | 84 | 82 | 80 | 78 | 76 | 76 | 76 | 76 | 76 | 76 | 76 | 76 | 76 | 76 | 76 | 76 |
| 35° | 90 | 88 | 86 | 84 | 82 | 80 | 80 | 80 | 80 | 80 | 80 | 80 | 80 | 80 | 80 | 80 |
| 36° | 96 | 94 | 92 | 90 | 88 | 86 | 84 | 84 | 84 | 84 | 84 | 84 | 84 | 84 | 84 | 84 |
| 37° | 102 | 100 | 98 | 96 | 94 | 92 | 90 | 88 | 88 | 88 | 88 | 88 | 88 | 88 | 88 | 88 |
| 38° | 108 | 106 | 104 | 102 | 100 | 98 | 96 | 94 | 92 | 92 | 92 | 92 | 92 | 92 | 92 | 92 |

TABLE 1-continued

| β | 0° | 1°<br>29° | 2°<br>28° | 3°<br>27° | 4°<br>26° | 5°<br>25° | 6°<br>24° | 7°<br>23° | 8°<br>22° | 9°<br>21° | 10°<br>20° | 11°<br>19° | 12°<br>18° | 13°<br>17° | 14°<br>16° | 15° |
|---|---|---|---|---|---|---|---|---|---|---|---|---|---|---|---|---|
| 39° | 114 | 112 | 110 | 108 | 106 | 104 | 102 | 100 | 98 | 96 | 96 | 96 | 96 | 96 | 96 | 96 |
| 40° | 120 | 118 | 116 | 114 | 112 | 110 | 108 | 106 | 104 | 102 | 100 | 100 | 100 | 100 | 100 | 100 |
| 41° | 126 | 124 | 122 | 120 | 118 | 116 | 114 | 112 | 110 | 108 | 106 | 104 | 104 | 104 | 104 | 104 |
| 42° | 132 | 130 | 128 | 126 | 124 | 122 | 120 | 118 | 116 | 114 | 112 | 110 | 108 | 108 | 108 | 108 |
| 43° | 138 | 136 | 134 | 132 | 130 | 128 | 126 | 124 | 122 | 120 | 118 | 116 | 114 | 112 | 112 | 112 |
| 44° | 144 | 142 | 140 | 138 | 136 | 134 | 132 | 130 | 128 | 126 | 124 | 122 | 120 | 118 | 116 | 116 |
| 45° | 150 | 148 | 146 | 144 | 142 | 140 | 138 | 136 | 134 | 132 | 130 | 128 | 126 | 124 | 122 | 120 |

It is apparent from Table 1 that nothing can be measured at pole angle β equal to 30°. At larger pole angles β, it is at least possible to determine the point in time at which stator poles 10 through 15 and rotor poles 17 through 20 diametrically oppose one another. At a pole angle of β=45°, it is possible to determine the position of rotor 16 within the ±15° segment precisely. It is easy to obtain a precision of less than 1°.

An exemplary embodiment of an electronically commutated motor not shown in the drawing is specified below, this embodiment having, for example, eight stator poles and six rotor poles. The stator poles may be connected to form a four-phase motor. If it is again assumed that stator pole angle $β_S$ and rotor pole angle $β_R$ are equal to β, it is possible to design the motor so that the following is true:

$$15° \leq β \leq 30°$$

the period of the surface change being=360°/(number of rotor poles 17 through 20)=360°/(number of stator poles 10 through 15), thus equaling 15° in this case. Here also it is assumed that the number of rotor poles 17 through 20 is not equal to the number of stator poles 10 through 15.

For reasons of symmetry, it is sufficient in this exemplary embodiment to determine the position within a 60° sector. Initially it is possible to determine the position of the rotor, for example, using the device known from the related art by determining a parameter of the individual inductances in the phases and a corresponding classification in four steps; the rotor position is then provided with the precision of a ±7.5° sector. For a more precise determination of the position of the rotor within the ±7.5° sector, it is now possible again to determine the surface at which the rotor and stator poles diametrically oppose one another.

The following table 2 again shows the sum of the angle sectors proportional to the surface at which the stator poles and rotor poles diametrically oppose one another.

TABLE 2

| β | 0°<br>15° | 1°<br>14° | 2°<br>13° | 3°<br>12° | 4°<br>11° | 5°<br>10° | 6°<br>9° | 7°<br>8° |
|---|---|---|---|---|---|---|---|---|
| 15° | 30 | 30 | 30 | 30 | 30 | 30 | 30 | 30 |
| 16° | 36 | 34 | 34 | 34 | 34 | 34 | 34 | 34 |
| 17° | 42 | 40 | 38 | 38 | 38 | 38 | 38 | 38 |
| 18° | 48 | 46 | 44 | 42 | 42 | 42 | 42 | 42 |
| 19° | 54 | 52 | 50 | 48 | 46 | 46 | 46 | 46 |
| 20° | 60 | 58 | 56 | 54 | 52 | 50 | 50 | 50 |
| 21° | 66 | 64 | 62 | 60 | 58 | 56 | 54 | 54 |
| 22° | 72 | 70 | 68 | 66 | 64 | 62 | 60 | 58 |
| 23° | 78 | 76 | 74 | 72 | 70 | 68 | 66 | 64 |
| 24° | 84 | 82 | 80 | 78 | 76 | 74 | 72 | 72 |
| 25° | 90 | 88 | 86 | 84 | 82 | 80 | 80 | 80 |
| 26° | 96 | 94 | 92 | 90 | 88 | 88 | 88 | 88 |
| 27° | 102 | 100 | 98 | 96 | 96 | 96 | 96 | 96 |
| 28° | 108 | 106 | 104 | 104 | 104 | 104 | 104 | 104 |
| 29° | 114 | 112 | 112 | 112 | 112 | 112 | 112 | 112 |
| 30° | 120 | 120 | 120 | 120 | 120 | 120 | 120 | 120 |

It is apparent from the table that favorable pole angles β in this embodiment of the electronically commutated motor are between 22° and 23°.

The surface may be determined capacitively and/or inductively. The inductive determination may be made with an auxiliary winding, which may be attached to all stator poles 10 through 15. In the exemplary embodiments shown according to FIG. 2, first through sixth sensor winding 27 through 32 is provided, which is connected in series and connected to first sensor terminal 39. First sensor signal analyzer 60 is connected to sensor terminal 39, the sensor signal analyzer determining inductance 61 of the entire system. Inductance 61 may, for example, be determined in a bridge circuit, which is not shown in greater detail. First sensor signal analyzer 60 supplies output signal 62, which is the measure for the surface or the position of rotor 16.

The inductance is determined by coefficient of self-induction L of the entire system. For the series connection of sensor windings 27 through 32 shown in the exemplary embodiment, the following applies:

$$L = \Sigma L_i = \Sigma \mu^* \mu_0^* F_i^* n^2 / 1 = (\Sigma F_i)^* \mu^* \mu_0^* n^2 / 1$$

$F_i$ denotes the partial surface arising on each of stator poles 10 through 15.

The surface may be determined capacitively. To this end, stator 16 is divided electrically into first and second stator segment 40, 41 at first and second points of separation 42, 43. Both segments 40, 41 are connected to second sensor terminal 44, to which second sensor signal analyzer 70 is connected. Second sensor signal analyzer 70 determines the capacitance that arises between first stator segment 40 and rotor 16 and between rotor 16 and second stator segment 41. In an electrical equivalent circuit diagram, it is possible to include two capacitors connected in series. In addition, a capacitance, which is, however, independent of the position of rotor 16, arises at each of points of separation 42, 43. The following applies to the capacitances:

$$1/C = 1/C_1 + 1/C_2$$

$C_1$ is the capacitance between first stator segment 40 and rotor 16 and capacitance $C_2$ is the capacitance between rotor 16 and second stator segment 41.

In a motor having a radius of rotor 16 of, for example, 5 cm and a pole surface of 40 cm² and assuming that stator pole angle $\beta_S$ is equal to rotor pole angle $\beta_R=45°$, the capacitor surfaces vary in the range of 53.5 cm² and 66.3 cm². At an assumed air gap of 0.2 mm between stator poles 10 through 15 and rotor poles 17 through 20, the capacitances vary between 230 pF and 300 pF.

In a motor having an assumed radius of rotor 16 of 5 cm and a pole surface of 40 cm² and further assuming that stator pole angle $\beta_S$ is equal to rotor pole angle $\beta_R=45°$, the surfaces vary in the range of 107 cm² and 132.6 cm².

For a pole height of 2.5 cm, ten windings, and a permeability of $\mu=1000$, the coefficient of self-inductance L varies between 650 µH and 800 µH.

Second signal analyzer 70 determines total capacitance 71 and outputs output signal 72 as a measure of the surface or the position of rotor 16.

Since both the inductive and the capacitive measurements are based on the surface change, a combination of both measuring methods may be provided to increase the measuring accuracy. In this embodiment, third sensor signal analyzer 80 is provided, which is connected to both first sensor terminal 39 and second sensor terminal 44. Third sensor signal analyzer 80 contains an oscillating circuit which contains inductance 61 and capacitance 71 of the system in the equivalent circuit diagram. The oscillating circuit may be designed as a series or parallel circuit. A variable frequency generator, which is not shown in greater detail, excites the oscillating circuit to oscillations. The resonance frequency voltage is measured. With the already specified examples of a variation of capacitance 71 in the range of 360 pF through 450 pF and inductance 61 in the range from 650 µH and 800 µH, the resonance frequency varies between 229 kHz and 182 kHz.

To improve the reliability against failure when measuring the position of rotor 16, the exemplary embodiment and/or exemplary method of the present invention provides a combination of at least two measuring methods. If the capacitive or the inductive measurement fails, the other measurement is always still available.

To reduce the probability of a failure of the electronically commutated motor as a whole, more than one triggering circuit may be used to supply pole windings 21 through 26. In the exemplary embodiment shown in FIG. 1 having the two stator segments 40, 41, advantageously two separate triggering circuits are provided. The position of rotor 16 is supplied to all triggering circuits to determine the point in time at which current is supplied to individual pole windings 21 through 26. Another measure to increase the operational reliability is to supply the triggering circuits with electrical energy from separate energy sources.

What is claimed is:

1. An electronically commutated motor having a motor-position detection which senses a surface where the stator and rotor poles (10 through 15; 17 through 20) diametrically oppose one another, wherein the total surface is taken into consideration in the position determination, and the pole angles ($\beta_S$, $\beta_R$) of the stator and rotor poles (10 through 15; 17 through 20) are each set to values at which a rotor rotation results in a surface change.

2. The electronically commutated motor as recited in claim 1, wherein the stator pole angle ($\beta_S$) is equal to the rotor pole angle ($\beta_R$).

3. The electronically commutated motor as recited in claim 1 or 2, wherein the stator is divided into at least two stator segments (40, 41) and the position determination is capacitive.

4. The electronically commutated motor as recited in one of the preceding claims, wherein the stator poles (10 through 15) contain sensor windings (27, 32) and the position measurement is inductive.

5. The electronically commutated motor as recited in claim 3 and 4, wherein an oscillating circuit is provided, and the position is determined by determining the resonance frequency.

6. The electronically commutated motor as recited in one of the preceding claims, wherein the motor is designed as a switched reluctance motor.

* * * * *

UNITED STATES PATENT AND TRADEMARK OFFICE
CERTIFICATE OF CORRECTION

| | |
|---|---|
| PATENT NO. | : 6,822,355 B2 |
| APPLICATION NO. | : 10/466154 |
| DATED | : November 23, 2004 |
| INVENTOR(S) | : Roland Karrelmeyer et al. |

It is certified that error appears in the above-identified patent and that said Letters Patent is hereby corrected as shown below:

Delete column 8, lines 11 to 38 and in its place, column 11, insert
--1. An electronically commutated motor, comprising:
  a stator;
  rotor poles;
  a motor-position determining arrangement to sense a surface where the stator and the rotor poles diametrically oppose one another, wherein a total surface is considered in determining the position determination, and pole angles of the stator and the rotor poles are each set to values at which a rotor rotation results in a surface change.

2. The electronically commutated motor of claim 1, wherein the stator pole angle is equal to a rotor pole angle.

3. The electronically commutated motor of claim 1, wherein the stator is divided into at least two stator segments and the motor-position determining arrangement includes a capacitive arrangement.

4. The electronically commutated motor of claim 1, wherein the stator poles include sensor windings and the motor-position determining arrangement includes an inductive arrangement.

5. The electronically commutated motor of claim 1, further comprising: an oscillating circuit to provide a resonance frequency, the position being determined by determining the resonance frequency.

UNITED STATES PATENT AND TRADEMARK OFFICE
CERTIFICATE OF CORRECTION

PATENT NO. : 6,822,355 B2
APPLICATION NO. : 10/466154
DATED : November 23, 2004
INVENTOR(S) : Roland Karrelmeyer et al.

It is certified that error appears in the above-identified patent and that said Letters Patent is hereby corrected as shown below:

6. The electronically commutated motor of claim 1, wherein the electronically commutated motor includes a switched reluctance motor.--

Signed and Sealed this

Twenty-fifth Day of September, 2007

JON W. DUDAS
*Director of the United States Patent and Trademark Office*